(12) United States Patent
Acero Acero et al.

(10) Patent No.: US 8,963,054 B2
(45) Date of Patent: Feb. 24, 2015

(54) COOKING HOB AND METHOD FOR THE OPERATION OF A COOKING HOB

(75) Inventors: Jesus Acero Acero, Saragossa (ES); José Miguel Burdio Pinilla, Saragossa (ES); Jose-Ramon Garcia Jimenez, Saragossa (ES); Ignacio Garde Aranda, Saragossa (ES); Pablo Jesus Hernandez Blasco, Saragossa (ES); Sergio Llorente Gil, Saragossa (ES); Alfonso Lorente Perez, Saragossa (ES); Fernando Monterde Aznar, Saragossa (ES); Ramon Peinado Adiego, Saragossa (ES)

(73) Assignee: BSH Bosch und Siemens Hausgeraete GmbH, Munich (DE)

(*) Notice: Subject to any disclaimer, the term of this patent is extended or adjusted under 35 U.S.C. 154(b) by 1722 days.

(21) Appl. No.: 12/084,163

(22) PCT Filed: Oct. 10, 2006

(86) PCT No.: PCT/EP2006/067220
§ 371 (c)(1),
(2), (4) Date: Apr. 24, 2008

(87) PCT Pub. No.: WO2007/048700
PCT Pub. Date: May 3, 2007

(65) Prior Publication Data
US 2009/0139980 A1 Jun. 4, 2009

(30) Foreign Application Priority Data
Oct. 27, 2005 (ES) .................... 200502708

(51) Int. Cl.
*H05B 3/68* (2006.01)
*H05B 6/04* (2006.01)
*H05B 6/06* (2006.01)
*H05B 6/12* (2006.01)

(52) U.S. Cl.
CPC ................. *H05B 6/04* (2013.01); *H05B 6/065* (2013.01); *H05B 6/1272* (2013.01); *Y02B 40/126* (2013.01)
USPC ...................................... 219/489; 219/443.1

(58) Field of Classification Search
CPC ........... H05B 6/02; H05B 6/06; H05B 6/062; H05B 6/065; H05B 6/12; H05B 6/1209; H05B 6/1227; H05B 6/1236; H05B 6/1245; H05B 6/1272; H05B 3/68
USPC ........... 219/443.1, 468.1, 476, 477, 480, 482, 219/486, 489, 508, 624–626, 656, 660–662, 219/665–669; 126/1 R; 5/443.1, 468.1, 476, 5/477, 480, 482, 486, 489, 508, 624–626, 5/656, 660–662, 665–669
See application file for complete search history.

(56) References Cited

U.S. PATENT DOCUMENTS 4,755,655 A * 7/1988 Reiche et al. ............ 219/448.11
6,528,770 B1 3/2003 Akel et al.
(Continued)

FOREIGN PATENT DOCUMENTS

| DE | 196 54 268 | 7/1997 |
| EP | 0 926 926 | 6/1999 |
| EP | 1 194 008 | 4/2002 |

OTHER PUBLICATIONS
International Search Report PCT/EP2006/067220.

*Primary Examiner* — Brian Jennison
(74) *Attorney, Agent, or Firm* — James E. Howard; Andre Pallapies

(57) ABSTRACT

A cooking hob, especially an induction cooking hob, including a first heating zone having at least two independently heatable heating elements operable by a first power supply via a first switching device, and at least one additional heating zone operable by a second power supply via a second switching device in a normal mode of operation. The heating capacity of the first heating zone can be increased beyond a maximum power of the first power supply while the first heating zone and the additional heating zone are operated simultaneously in the normal mode of operation. The cooking hob includes a switching element for establishing a power supply connection between the second power supply and one of the heating elements of the first heating zone in a special mode of operation so as to increase the heating capacity of the first heating zone.

13 Claims, 3 Drawing Sheets

(56) References Cited

U.S. PATENT DOCUMENTS

Figure 1:
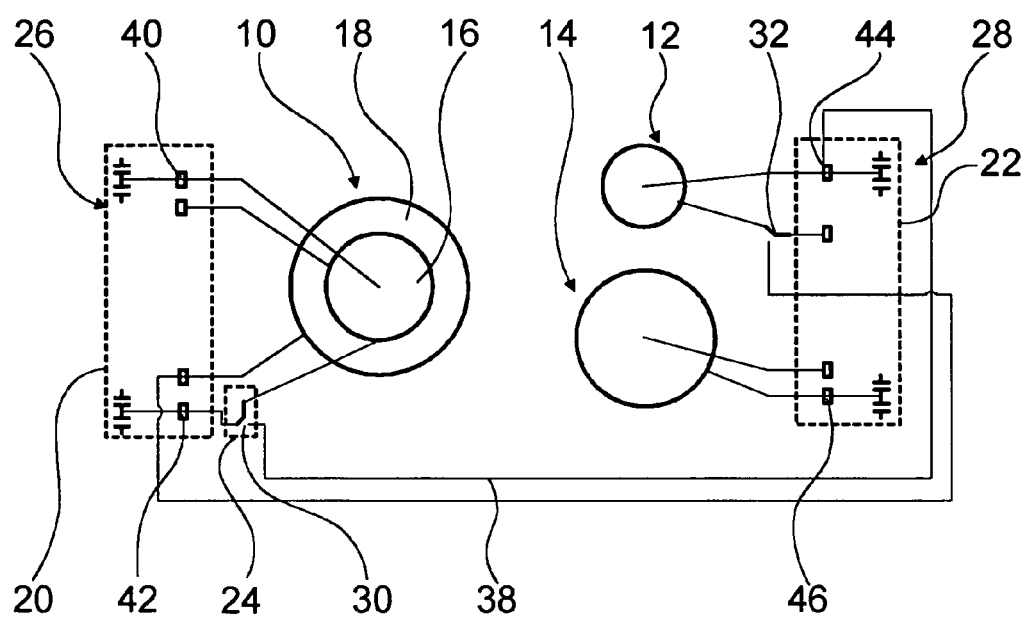

2005/0109770 A1* 5/2005 Esteras Duce et al. ....... 219/633
2006/0243723 A1* 11/2006 Cornec et al. ................. 219/660
2007/0135037 A1 6/2007 Barragan Perez et al.

* cited by examiner

COOKING HOB AND METHOD FOR THE OPERATION OF A COOKING HOB

The invention is based on a cooktop as claimed in the preamble of claim 1 and on a method of operating a cooktop as claimed in the preamble of claim 12.

An induction cooktop with at least one first heating zone having at least two independent heating elements, which in a normal mode are operated via at least one first switching device with a first power supply device, is known from WO 2005/043737 A2. In normal operating mode, depending on the size of a container of food to be cooked or a pot which is placed on the heating zone, both heating elements or only one heating element of the heating zone are operated.

Also known from the prior art are induction cooktops with further heating zones for heating further containers of food to be cooked or pots, which in normal operating mode are operated via a second switching device with a second power supply device.

The object of the invention consists especially of providing a generic cooktop with a special operating mode in which a heat output of the first heating zone can be increased beyond a maximum output of the first power supply device and in which in the normal operating mode the first heating zone with the two heating elements and the further heating zone can be operated simultaneously.

The object is achieved in accordance with the invention by the features of claim 1, with advantageous embodiments and developments of the invention able to be taken from the subclaims.

The invention is based on a cooktop, especially an induction cooktop, with at least a first heating zone which features at least two independently heatable heating elements, which in a normal operating mode are operated via a first switching device with a first power supply device, and with at least one further heating zone, which in normal operating mode is operated via a second switching device with a second power supply device.

It is proposed that the cooktop include a switching element for establishing a power supply connection between the second power supply device and one of the heating elements of the first heating zone, with the power supply connection being established in a special operating mode for increasing a heat output of the first heating zone. The result which can be achieved by this is that the second power supply device is only included for supplying the first heating zone if the special operating mode is switched on or only precisely if heat output exceeding the maximum power of the first power supply device is required. The particular result that can be achieved is that the second power supply device, in normal mode, and indeed even if the two heating elements of the first heating zone are in the operation, is always available for operating the further heating zone.

A heating zone in this context is to be designated as an area onto which an individual container of food to be cooked or an individual pot can be placed, where the size and the form of the heating zone can be varied by activating and deactivating heating elements. Although the inventive idea can predominantly be beneficially employed in the area of induction cooktops because of the high-frequency technology employed therein, in principle its use within the context of cooktops with resistive heating elements is also conceivable.

In particular where the heating elements are embodied as induction coils, intermodulation humming when operating a number of heating elements with different frequencies can be avoided. The intermodulation humming can be avoided especially safely if the cooktop includes a synchronization line for synchronization of the power supply devices. To synchronize the power supply devices a frequency generator of a first power supply device can be employed as master and a frequency generator of the second power supply device as slave. The frequency generators of the power supply devices can be embodied in an especially space-saving and cost-effective manner as application-specific integrated circuits (ASICs) each of which controls an inverter of the power supply device. The application-specific integrated circuits can for their part be operated by a low-frequency switching microcontroller, which together with the ASIC and the inverter can be arranged on a common circuit board which carries the switching device. Embodiments of the invention are also conceivable in which the two switching devices are carried on one common circuit board.

A convenient short-term increase in the heating output can be achieved by a switching means for manual activation of the special operating mode. Overheating of the cooktop can be avoided if the special operating mode deactivates automatically after a preset time has elapsed. This means that the special operating mode can be regarded as a short-term heat output boost. Embodiments of the invention are also conceivable in which the special operating mode is automatically deactivated on reaching a temperature threshold.

An overload of the second power supply device can be avoided if the further heating zone is deactivated in the special operating mode. This can either be achieved by the second heating zone being deactivated for the duration of operation in the special operating mode or by the fact that switching on the special operating mode is always blocked if the further heating zone is active and that conversely the further heating zone cannot be connected-in during the operation in the special operating mode.

If the cooktop includes a connecting line for connection of the second power supply device to one of the heating elements of the first heating zone, crosstalk of the frequencies of the two power supply devices can be at least reduced by a remote arrangement of said devices.

A fault caused by an interference frequency, as is created by a non-linear overlaying of the conversion frequencies of the two switching devices, can be controlled if one of the switching devices is designed to restrict a differential frequency between a conversion frequency of the first switching device and a conversion frequency of the second switching device. An audible acoustic fault can be completely avoided if the switching device is provided for defining the differential frequency so that it lies outside an audible frequency band.

If the cooktop includes a switching device for altering the logical relationships between the power supply devices and the heating zones for switching between the normal operating mode and the special operating mode, the power supply devices from conventional cooktops can be used in the inventive cooktop very largely without changes. A number of additional cable runs can be reduced.

Additional lines carrying a working current can be avoided if a first switch for separating a first heating element of the first heating zone of the first power supply device is arranged in the first switching device.

Further advantages in respect of saving in cabling can be achieved if the switching element is arranged for connection of the first heating element of the first heating zone to the second power supply device in the second switching device. This means that radiation losses of the lines can be avoided, especially in normal operation.

The invention further relates to a method for operating a cooktop, especially an induction cooktop, with at least a first heating zone which features at least two independently heatable heating elements, with the two heating elements being operated in normal mode via a first switching device with a first power supply, and a further heating zone being operated via a second switching device with a second power supply device.

It is proposed that to switch on and switch off a special operating mode for increasing the heat output of the first heating zone, a switching element for establishing a power supply connection between the second power supply device and one of the heating elements of the first heating zone is actuated. In particular this allows a generic cooktop to be operated in a special operating mode in which a heating output of the first heating zone can be increased beyond a maximum power of the first power supply device. In normal operating mode the two heating elements of the first heating zone and the further heating zone can be operated simultaneously.

Further advantages emerge from the description of the drawing given below. The drawing represents exemplary embodiments of the invention. The drawing, the description and the claims contain numerous features in combination. The person skilled in the art would expediently also consider the features individually and combine them into further sensible combinations.

Figure 2:
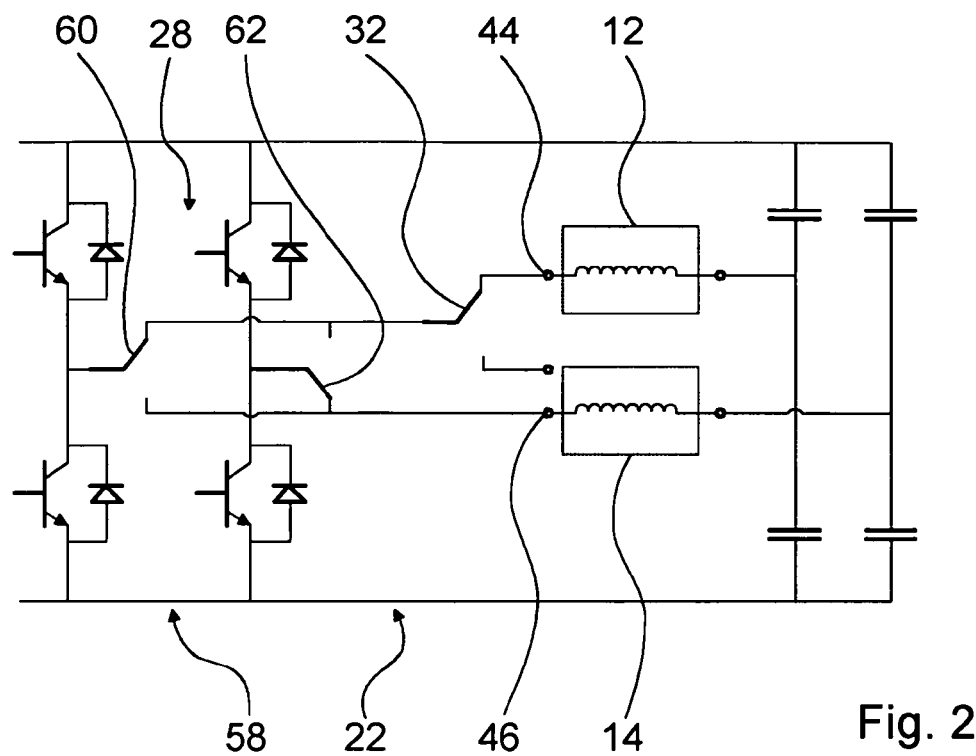
Figure 3:
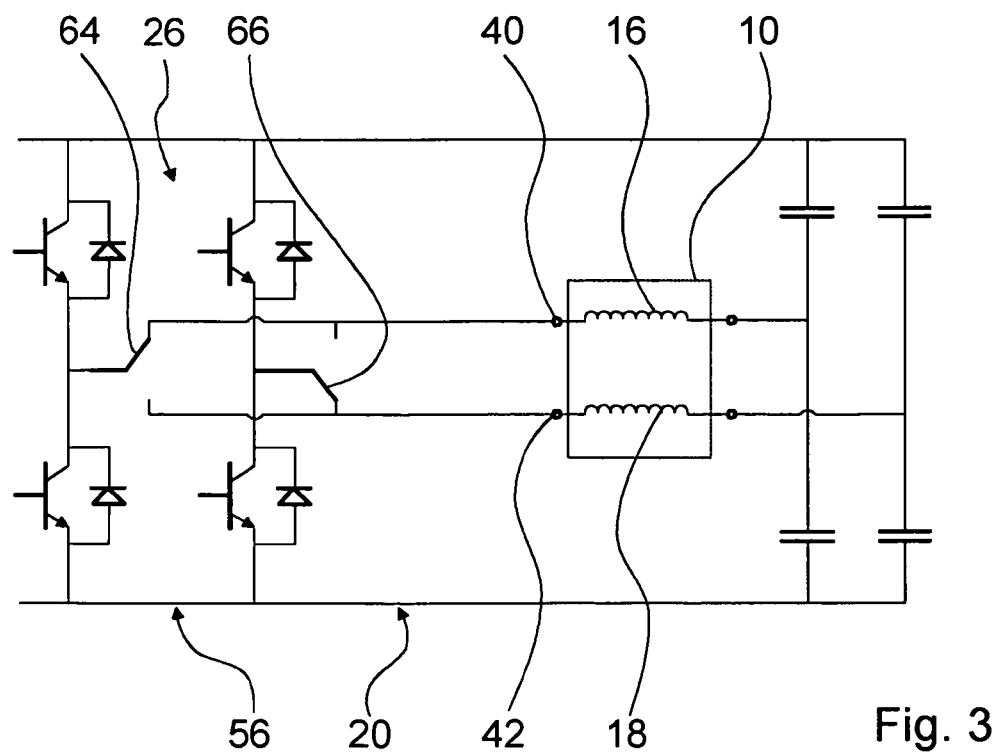
Figure 4:
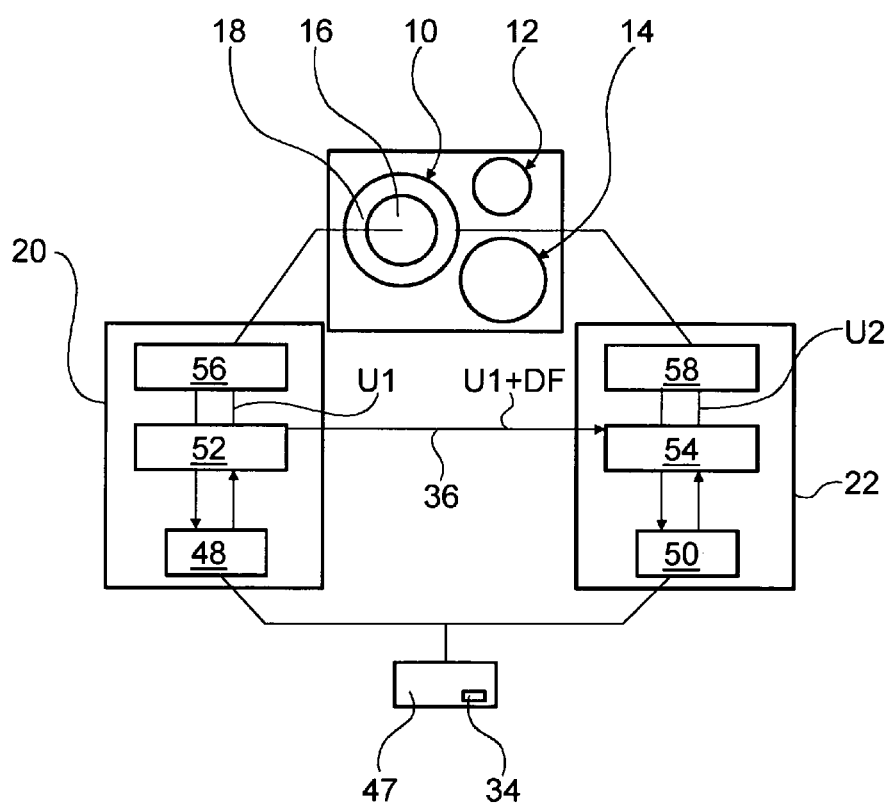

The figures show:

FIG. 1 an induction cooktop in a schematic presentation,

FIG. 2 a schematic block diagram of a switching device of the induction cooktop from FIG. 1, FIG. 3 a schematic block diagram of a further switching device of the induction cooktop from FIG. 1 and FIG. 4 the switching device from FIGS. 2 and 3 in a further schematic presentation.

FIG. 1 shows an induction cooktop with a total of three heating zones 10, 12, 14. A first heating zone 10 features two independently-operatable heating elements 16, 18 in the form of concentric rings, which in a normal operating mode are operated via a first switching device 20 with a first power supply device 26. To operate the heating elements 16, 18 the power supply device 26 has two outputs 40, 42. The heating elements 16, 18 are embodied as induction coils and are intended to transmit electrical energy to a resonator circuit in a container for food to be cooked or pot not shown here which can be arranged on the induction cooktop. The induction cooktop further includes a cooking pot detection system, which uses the load or a complex-value impedance of the heating elements 16, 18 to detect whether a cooking container is standing on the induction cooktop and the size of the container for food to be cooked. If the food container is much larger than the inner heating element 16, the first switching device 20, to heat the food container, in addition to the inner heating element 16, also switches in the first outer heating element 18 which surrounds the inner heating element 16 in the form of a ring.

The two further heating zones 12, 14 are operated in normal operating mode via a second switching device 22 with a second power supply device 28 which likewise has two outputs 44, 46.

A power supply connection between the second power supply device 28 and the outer ring-shaped heating element 18 of the first heating zone 10 can be established by two switching elements 30, 32. This occurs if an operator uses an input unit 47 (FIG. 4), which is embodied in the present case as a keyboard, to start the special operating mode for increasing a heat output of the first heating zone 10.

The input unit 47 includes a special key which forms a switching element 34 for manual activation of the special operating mode. After a preset time has elapsed the special operating mode ends automatically and without further operator intervention.

If the special operating mode is activated, the two further heating zones 12, 14 are deactivated simultaneously. To do this the high-frequency ac voltage created by the corresponding output 44 of the second power supply device 28 is produced by the rearrangement or electronic switchover of the integrated switched element 32 in the second switching device 22 to a connecting line 38. The connecting line 38 is provided for connection of the second power supply device 28 to the outer heating element 18 of the first heating zone 10.

The connecting line 38 comes out into a further switching device 24 for changing the linkages between the power supply devices 26, 28 and the heating zone 10, 12, 14. The further switching device 24 changes these linkages for switchover between the normal operating mode and the special operating mode and also includes the first switching element 30. To activate the special operating mode, by switching over a first switching element 30 of the further switching device 24, a connection between the output 42 of the first power supply device 26 and the outer heating element 18 of the first heating zone 10 is interrupted and simultaneously a connection between the outer heating element 18 and the connecting line 38 or the output 44 of the second power supply device 28 is established. The switching elements 30, 32 are switched simultaneously by a central control unit of the induction cooktop. The further switching device 24 and thereby also the first switching element 30 are integrated into the first switching device 20 or are arranged immediately beside the first switching device 20.

The first switching element 30 is thus used for connection of the outer heating element 18 of the first heating zone 10 to the second power supply device 28 and is arranged in the second switching device 22 or integrated into the second switching device 22.

FIG. 2 shows the right-hand switching device 22 from FIG. 1 in a more detailed diagram. The switching device 22, in addition to an inverter circuit 58 for independent power supply of the heating zone 12, 14, includes two switching elements 60, 62 for switchover between submodes of the normal operating mode, in which optionally one of the heating zones 14 or both heating zones 14 are operated. The inverter circuit 58 includes a total of four inverter diodes and four capacitors. In addition the switching element 32 is integrated into the switching device 22.

Similarly FIG. 3 shows the left-hand switching device 20 from FIG. 1 in a more detailed diagram. The switching device 20, in addition to an inverter circuit 56 for independent power supply of the heating elements 16, 18 of the heating zone 10, includes two switching elements 64, 66 for switchover between submodes of the normal operating mode, in which optionally one of the heating elements 18 or both heating elements 18 of the heating zone 10 are operated.

FIG. 4 shows the two switching devices 20, 22 and power supply devices 26, 28 in an alternate diagram. Each of the switching devices 20, 22 includes a microcontroller 48, 50, which is controlled by signals of the input unit 47. The input unit 47 also includes a central control unit for controlling an entire cooker which, as well as the induction cooktop, also includes an oven not explicitly shown here. The microcontrollers 48, 50 in their turn each control an ASIC 52, 54 (Application Specific Integrated Circuit), which create the high-frequency signals necessary for creating a high-frequency heating voltage and pass them to the inverter circuits 56, 58 shown in greater detail in FIGS. 2 and 3.

The two switching devices 20, 22 are connected to each other by a synchronization line 36 for synchronizing the power supply devices 26, 28 in the special operating mode. If the special operating mode is activated, the ASIC 52 operates first switching device 20 as master and forwards the conversion frequency U1 and a differential frequency DF to the further switching device 22 acting as the slave or to the corresponding ASIC 52. This blocks the functions of the microcontroller 50 of the further switching device 24. A phase control signal in particular can also be transmitted via this synchronization line.

Though this wiring as master and slave and through the synchronization line 36 the first switching device 20 is designed so that in the special operating mode a differential frequency DF between a conversion frequency U1 of the first switching device 20 and a conversion frequency U2 of the second switching device 22 always has the value zero and is thus restricted. In particular the differential frequency DF lies outside the audible frequency band of about 100 Hz to 10 kHz.

Further embodiments of the invention are conceivable, in which through the synchronization line 36 only a specific limit value of a frequency range which differs from zero and is dependent on conversion frequency U1, within which the further switching device 22 or the microcontroller 50 can determine the conversion frequency U2 in accordance with the desired heating effect, without the differential frequency DF between the conversion frequencies U1, U2 being able to come into the audible frequency band and thereby being able to create a disturbing humming or noise.

REFERENCE SYMBOLS

10 Heating zone
12 Heating zone
14 Heating zone
16 Heating element
18 Heating element
20 Switching device
22 Switching device
24 Switching device
26 Power supply device
28 Power supply device
30 Switching element
32 Switching element
34 Switching element
36 Synchronization line
38 Connecting line
40 Output
42 Output
44 Output
46 Output
47 Input unit
48 Microcontroller
50 Microcontroller
52 ASIC
54 ASIC
56 Inverter circuit
58 Inverter circuit
60 Switching element
62 Switching element
64 Switching element
66 Switching element
U1 Conversion frequency
U2 Conversion frequency
DF Differential frequency

The invention claimed is:

1. A cooktop comprising:
   at least two independently operable first heating elements defining a first heating zone;
   a first power supply for operating the at least two first heating elements in a normal operating mode;
   at least one second heating element defining a second heating zone, wherein the first power supply is isolated from the second heating zone;
   a second power supply for operating the second heating element in the normal operating mode, wherein the at least two first heating elements in the first heating zone and the at least one second heating element in the second heating zone are simultaneously operable in the normal operating mode;
   a first switching device in operational communication with the at least two first heating elements and the first power supply for selectively applying power from the first power supply to the at least two first heating elements in the normal operating mode, and wherein the first switching device is configured for directing power from the first power supply to the second heating zone;
   a second switching device in operational communication with the at least one second heating element and the second power supply for selectively applying power from the second power supply to the at least one second heating element in the normal operating mode; and
   at least one third switching device in operational communication with the second power supply and only one of the at least two first heating elements for establishing an operational connection between the second power supply and only one of the at least two first heating elements defining a special operating mode for increasing a heat output of the first heating zone, and wherein the second heating zone is not operable from the first power supply.

2. The cooktop according to claim 1 wherein the at least two first heating elements and the at least one second heating element are formed as induction coils.

3. The cooktop according to claim 2 and further comprising a synchronization line in operational communication with the first power supply and the second power supply for synchronizing the first power supply and the second power supply in the special operating mode wherein the first power supply is used as for frequency determination and the second power supply is set to the frequency of the first power supply.

4. The cooktop according to claim 1 wherein the third switching device includes a manually operable switch to activate the special operating mode.

5. The cooktop according to claim 1 and further comprising means for deactivating the second heating zone in the special operating mode.

6. The cooktop according to claim 1 and further comprising a connecting line for connection of the second power supply to one of the at least two first heating elements.

7. The cooktop according to claim 1 wherein one of the switching devices includes means for limiting a differential frequency between a conversion frequency of the first switching device and a conversion frequency of the second switching device.

8. The cooktop according to claim 1 and further comprising a switching device for changing the linkages between the first power supply and the second power supply and the heating zones for switchover between the normal operating mode and the special operating mode.

9. The cooktop according to claim 7 wherein one of the switching devices includes means for defining the differential frequency so that it lies outside an audible frequency band.

10. The cooktop according to claim 1 wherein a first switching element for separating one of the at least two first heating elements of the first heating zone of from the first power supply device is operationally associated with the first switching device.

11. The cooktop according to claim 10, characterized in that the switching element for connection of one of the at least two first heating elements of the first heating zone to the second power supply is operationally associated with the second switching device.

12. A method for operating a cooktop comprising the steps of: providing a cooktop including at least two independently operable first heating elements defining a first heating zone; a first power supply for operating said heating elements in a normal operating mode; a first switching device in operational communication with at least one of the at least two first heating elements and said first power supply for selectively applying power from the first power supply to the at least two first heating elements in the normal operating mode, wherein the first power supply is isolated from the second heating zone; at least one second heating element defining a second heating zone; a second power supply for operating said second heating element in a normal operating mode wherein the at least two first heating elements in the first heating zone and the at least one second heating element in the second heating zone are simultaneously operable in the normal operating mode, and wherein the first switching device is configured for directing power from the first power supply to the second heating zone; a second switching device in operational communication with said at least one second heating element and said second power supply for selectively applying power from the second power supply to said at least one second heating element in the normal operating mode; and at least one third switching device in operational communication with said second power supply and only one of said at least two first heating elements for establishing an operational connection between the second power supply and only one of the first heating elements defining a special operating mode for increasing a heat output of the first heating zone, wherein the second heating zone is not operable from the first power supply; and actuating the at least one third switching device to establish an operational connection between at least one of the at least two first heating elements and the second power supply for switching on the special operating mode for increasing a heat output of the first heating zone.

13. A cooking hob comprising:
at least two independently user-operable first heating elements formed as induction coils and defining a first heating zone;
a first power supply for operating the at least two first heating elements in a normal operating mode, wherein the first power supply is isolated from the second heating zone;
at least one second heating element defining a second heating zone;
a second power supply for operating the second heating element in the normal operating mode, wherein the at least two first heating elements in the first heating zone and the at least one second heating element in the second heating zone are simultaneously operable in the normal operating mode;
a first switching device in operational communication with the at least two first heating elements and the first power supply for selectively applying power from the first power supply to the at least two first heating elements in the normal operating mode, and wherein the first switching device is configured for directing power from the first power supply to the second heating zone;
a second switching device in operational communication with the at least one second heating element and the second power supply for selectively applying power from the second power supply to the at least one second heating element in the normal operating mode; and
at least one third switching device in operational communication with the second power supply and only one of the at least two first heating elements for establishing an operational connection between the second power supply and only one of the at least two first heating elements defining a special operating mode for increasing a heat output of the first heating zone, and wherein the second heating zone is not operable from the first power supply; and
a synchronization circuit in operational communication with the first power supply and the second power supply for synchronizing the first power supply and the second power supply in the special operating mode.

* * * * *